United States Patent [19]

Otto et al.

[11] Patent Number: 6,159,275
[45] Date of Patent: Dec. 12, 2000

[54] PAINTS AND PRINTING INKS CONTAINING MODIFIED CARBON BLACKS

[75] Inventors: Karin Otto, Bonn; Peter Stroh, Altenstadt, both of Germany

[73] Assignee: Degussa-Hüls Aktiengesellschaft, Frankfurt am Main, Germany

[21] Appl. No.: 09/213,358

[22] Filed: Dec. 17, 1998

[30] Foreign Application Priority Data

Dec. 18, 1997 [DE] Germany .......................... 197 56 465

[51] Int. Cl.⁷ .................................................. C09D 11/00
[52] U.S. Cl. ........................ 106/31.9; 106/404; 106/417; 106/475
[58] Field of Search ................. 106/31.9, 404, 106/417, 475

[56] References Cited

U.S. PATENT DOCUMENTS

| | | | |
|---|---|---|---|
| 5,246,492 | 9/1993 | Arima et al. ........................... | 106/404 |
| 5,672,200 | 9/1997 | Heinz et al. ............................ | 106/417 |
| 5,747,562 | 5/1998 | Mahmud et al. ........................ | 106/475 |
| 5,749,950 | 5/1998 | Mahmud et al. ........................ | 106/316 |
| 5,948,835 | 9/1999 | Mahmud et al. ........................ | 523/215 |

FOREIGN PATENT DOCUMENTS

97/47698  12/1997  WIPO .

OTHER PUBLICATIONS

Patent Abstracts of Japan, vol. 012, No. 297, Aug. 12, 1988, JP 63 063755, Mar. 22, 1988.

*Primary Examiner*—Helene Klemanski
*Attorney, Agent, or Firm*—Smith, Gambrell & Russell, LLP

[57] ABSTRACT

Paints and printing inks are disclosed which contain carbon black as the pigment. The dispersion and storage stability of printing inks and paints may be improved by using carbon blacks containing silicon. The rheological behavior of the paints is improved by silicon-doping of the carbon blacks used. Paints having a reduced solvent content are consequently obtainable.

12 Claims, No Drawings

PAINTS AND PRINTING INKS CONTAINING MODIFIED CARBON BLACKS

INTRODUCTION AND BACKGROUND

This present invention relates to paints and printing inks which contain carbon black as the pigment.

The black pigment used in paints and printing inks is predominantly carbon black due to its excellent properties. Apart from use for the production of pure black colors, carbon black is also used for tinting with other pigments, in particular for the production of grey hues by blending carbon black with white pigments such as titanium dioxide and other white pigments.

Pigment blacks are available in a large selection of grades having differing properties. Various processes are used for producing pigment blacks. The most common process is production by oxidative pyrolysis of carbon black feedstocks containing carbon. In this process, the carbon black feedstocks are incompletely combusted at elevated temperatures in the presence of oxygen. This class of carbon black production processes includes, for example, the furnace black process, the gas black process and the lamp black process. The carbon black feedstocks containing carbon which are used are primarily polycyclic aromatic hydrocarbon feedstock oils. The product stream from oxidative pyrolysis consists of an off-gas containing hydrogen and carbon monoxide and finely divided carbon black suspended therein, which is separated from the off-gas in a filter unit.

Production processes by oxidative pyrolysis include the furnace black process, the lamp black process and the gas black process. In the furnace black process, incomplete combustion proceeds in a reactor lined with highly temperature resistant refractory material. A fuel/air mixture is combusted in a precombustion chamber to produce a flame, into which the carbon black feedstock is sprayed or injected. As the carbon black is formed, it is quenched by spraying water into the reactor and separated from the gas stream. The furnace black process allows the production of carbon blacks having a very wide range of technical properties.

Lamp black and gas black processes are important alternatives to the furnace black process. They yield carbon blacks having properties which partially overlap with those technical properties obtainable by the furnace black process, but also allow the production of carbon blacks which cannot be produced using the furnace black process.

The lamp black apparatus consists of a cast iron pan which holds the liquid or optionally molten feedstock and a refractory-lined fume hood. The air gap between the pan and fume hood and the reduced pressure within the system act to control the input of air and thus to influence the properties of the carbon black. As a result of radiant heat input from the fume hood, the feedstock is vaporized and is partially combusted, but mainly converted into carbon black. The carbon black is separated by passing the process gases containing carbon black, once cooled, into a filter.

In the gas black process, the carbon black feedstock is first vaporized in a carrier gas stream containing hydrogen and then combusted in a plurality of small flames beneath a cooled roller. A proportion of the resultant carbon black is deposited on the roller, while another proportion is discharged with the process gases and deposited in a filter.

The important properties for evaluating pigment blacks are jetness (or blackness value) $M_y$ (DIN 55979), tinting strength (according to DIN EN ISO 787/16 and DIN EN ISO 787/24), oil absorption (DIN EN ISO 787/5), volatile matter (DIN 53552), structure, measured as DBP adsorption (DIN 53601, ISO 4656 or ASTM D2414), average primary particle size (by evaluating electron micrographs) and pH value (DIN EN ISO 787/9 or ASTM D1512).

Table 1 shows the range of pigment black properties obtainable by the stated production processes.

TABLE 1

| Property | | Furnace black | Gas black | Lamp black |
| --- | --- | --- | --- | --- |
| Jetness $M_y$ | | 210–270 | 230–300 | 200–220 |
| Tinting Strength IRB3 = 100 | [%] | 60–130 | 90–130 | 25–35 |
| Oil absorption | [g/100 g] | 200–500 | 220–1100 | 250–400 |
| Volatile matter | [wt. %] | 0.5–6.0 | 4–24 | 1–2.5 |
| DBP absorption | [ml/100 g] | 40–200 | | 100–120 |
| Particle size | [nm] | 10–80 | 10–30 | 110–120 |
| Particle size distribution | | | narrow | wide |
| pH value | | 6–10 | 4–6 | 6–9 |

The most important properties for the selection of pigment blacks are the jetness and structure thereof. Jetness is directly dependent upon particle size. The smaller the particles are, the greater is the jetness of the pigment black. Particle size furthermore influences other properties such as oil absorption and viscosity of the finished paint or printing ink. The structure of the carbon black also influences the viscosity of the finished product and is significant for the production and processing of the paints and printing inks. An elevated structure entails an elevated viscosity at a given pigment content and vice versa.

Important applicational properties of a paint or printing ink are the stability of the carbon black dispersion in the binder system (storage stability), flooding behavior in pigment mixtures and the rheological behavior of the paint or printing ink (viscosity and thixotropy).

The stability of the carbon black dispersion in a binder may, for example, be improved by adding fumed silica. Adding silica may, however, result in an undesirable increase in the viscosity of the product. The elevated viscosity may be offset by adding a greater quantity of solvents. But the greater quantity of solvents is of disadvantage since the pigment loading is reduced and also from environmental considerations.

Paints may exhibit so-called flooding if they contain a mixture of pigments. Flooding is taken to mean the observed phenomenon that, for example, in grey paints the white pigments and the carbon black become separated during paint drying, so distorting the color. This behavior is readily tested by the "rub-out test". In this test, the paint is applied onto a test surface. After partial drying for a short period, one half of the test surface is rubbed out, for example, using a finger. If flooding had brought about separation of the two pigments, this separation is reversed by the mechanical stress during rubbing out and a distinct difference in the color of the two halves is evident. This property may give rise to differing hues on practical use of the paint and should thus be kept as low as possible.

Elevated carbon black concentrations are desired in mill base formulations. This results in economic advantages due to increased throughputs and to environmental advantages due to reduced solvent requirements and the possibility of producing low-solvent, "high-solids" paints.

An object of the present invention is to provide paints and printing inks which are improved with regard to the storage stability, flooding behavior and solvent requirement thereof in comparison with conventional paint formulations. Within the scope of the present invention it is understood that the wording "paints and printing inks" encompasses also non-impact printing inks and toner.

SUMMARY OF THE INVENTION

The above and other objects of the invention can be achieved by employing a carbon black containing 0.1 to 30 wt. % of silicon, calculated as silicon dioxide, relative to the total weight thereof as a component in a paint or printing ink formulation. Typically, such formulations also contain a binder component.

Carbon blacks containing silicon are known, for example, from WO 96/37547, where they are described for use in rubber compositions. Carbon blacks containing silicon may, for example, be produced by adding compounds containing silicon to the carbon black feedstock. Alternatively, it is possible to introduce the compounds containing silicon into the educt stream of the particular carbon black process just upstream from or directly into the carbon black formation zone.

Suitable compounds containing silicon are organosilicon compounds such as organosilanes, organochlorosilanes, siloxanes and silazanes. In particular, silicon tetrachloride, siloxanes and silazanes are suitable. Methyl or ethyl silicates, siloxanes and silazanes are preferably used for the production of the carbon blacks containing silicon. These substances are preferably mixed into the carbon black feedstock itself.

When silicon compounds containing nitrogen, such as the silazanes, for example, are used, chemically incorporated nitrogen atoms e.g. in the form of aminofunctional groups are found in the carbon black again along with the oxide bound silicon atoms. Such carbon blacks may contain 0,01 to 2 % by weight nitrogen in addition to silicon, depending on the nitrogen content of the initial compounds and their concentration in the carbon black feedstock.

DETAILED EMBODIMENTS OF THE INVENTION

The carbon blacks of the invention surprisingly exhibit highly positive properties in paints and in printing inks. Thus, for example, the dispersion stability of paints and printing inks is increased without any consequent substantial impairment of viscosity. This is unexpected, as the conventional manner of increasing storage stability by adding highly disperse silica, i.e. by separate addition of a silicon compound to the paint binder system, has hitherto always also resulted in thickening of the paint. In contrast, the use of carbon blacks containing silicon improves storage stability without resulting in an increase in viscosity in the same manner as when the storage stability of carbon blacks containing no silicon is improved by adding fumed silica.

Viscosity of the paint or printing ink is particularly pronounced when using high structure carbon blacks having DBP adsorption values of above 100 ml/100 g. Viscosity may be distinctly reduced by using carbon blacks containing silicon. In organic paint binders, this allows a desired paint viscosity to be established with smaller quantities of solvents.

When preparing grey paints with pigments such as, for example, titanium dioxide and/or zinc oxide, using the carbon blacks containing silicon, distinctly reduced flooding of the paint is another positive property of these carbon blacks. In addition to the combination with white pigments, the advantageous properties of the carbon blacks containing silicon may also be exploited in combination with colored pigments, such as for example cadmium, cobalt and iron compounds of a differing chemical structure.

The silicon containing carbon blacks can very advantageously be combined with platelike pigments such as mica pigments and aluminum flakes. These pigments show their full pigmenting effect only if they have the possibility to arrange themselves in parallel to the paint layer. For this purpose paints with low viscosity and low thixotropy are desirable. The use of silicon containing carbon blacks reduces the viscosity of paints and thereby facilitates parallel arrangement of the platelike pigments. Therefore, for example, the micaceous effect is enhanced.

The following Examples are intended to illustrate the invention in greater detail. The technical properties of the paints were determined using the following methods and standards:

Blackness value $M_y$
(jetness) DIN 55 979
Density : according to "Technical Bulletin Pigments" No. 24 from Degussa AG, page 13
Haze/gloss : Measurement with Byk haze/gloss Meter (DIN 67530)
Viscosity : Measurement with rotational Viscosimeter (ISO 3219/DIN 53019)
Thixotropy-Index: according to "Technical Bulletin Pigments" No. 54 from Degussa AG, page 3
Flooding behavior: DIN 55 945

The blackness value (jetness) $M_y$ usually is used for characterization of black paints and printing inks. In contrast, grey paints are characterized by their optical density D according to "Technical Bulletin Pigments" No. 24 from Degussa AG, page 13, which is defined by $$D = 2 - \log(R),$$

wherein the reflectance R is given in percentage values. An ideally white paint with a reflectance of 100% therefore has the density D=0.

The thixotropy-index is explained in "Technical Bulletin Pigments" No. 54 from Degussa AG, page 3. This index is the ratio of the viscosity at low ($\eta_1$) and high ($\eta_2$) shear rate SR:

$$\text{Thixotropy-Index} = \eta_1/\eta_2$$

EXAMPLE 1

Four different carbon blacks were produced using the furnace black process. Differing quantities of silicone oil (polydimethylsiloxane, CAS no. 63148-62-9) were added to the carbon black feedstock. The technical properties of these carbon blacks are reproduced in table 2.

TABLE 2

Technical properties of Si-doped carbon blacks

| Properties | | Carbon black 1 | Carbon black 2 | Carbon black 3 | Carbon black 4 |
|---|---|---|---|---|---|
| Ash | wt. % | 0.1 | 12.1 | 14.2 | 15.7 |
| CTAB | $m^2/g$ | 120 | 115 | 117 | 121 |
| Iodine adsorption | mg/g | 142 | 99 | 110 | 116 |
| BET surface area | $m^2/g$ | 130 | 126 | 133 | 150 |
| DBP | ml/100 g | 124 | 106 | 111 | 107 |
| Volatile matter | wt. % | 1.1 | 3.4 | 3.4 | 3.9 |
| pH value | | 9.1 | 6.7 | 6.9 | 6.8 |

The ash content of the above carbon blacks substantially consists of highly disperse silicon dioxide. Carbon black 1 is a comparison black having an ash content of only 0.1 wt. %, which was produced without adding silicone oil to the carbon black feedstock. Carbon black 2, carbon black 3 and carbon black 4 contain approx. 12, 14 and 16 wt. % of silicon dioxide.

Application testing:

The four carbon blacks from table 2 were used to produce black paints in a two-component binder system based on hydroxylated acrylate resins with isocyanates as the curing agent.

The paints were produced using a binder solution comprising 60 wt. % Synthalan LS768 from Synthopol Chemie, Buxtehude, in 98% butyl acetate. The binder is a hydroxylated acrylate resin containing 1.5 wt. % of OH groups. Carbon black was added to the binder solution in a quantity of 45 wt. %, relative to the solids content of the solution. 80 g of this base formulation were dispersed for 5 minutes with a high speed stirrer. 550 g of steel beads were then added and the mixture dispersed for one hour using a Scandex dispersion unit. The steel beads were then screened out and production of the paint concluded by mixing in further binder solution. Dilution with further binder solution reduced the carbon black content of the finished paint to 5 wt. %, relative to the binder content of the paint.

The paints were combined with isocyanate-based curing agent (Desmodur N from Bayer) and applied onto glass sheets to a wet film thickness of 150 μm. The $M_y$, $M_C$, gloss and haze of the dried paints were measured.

TABLE 3

Testing results

| Properties | | Carbon black 1 | Carbon black 2 | Carbon black 3 | Carbon black 4 |
|---|---|---|---|---|---|
| Jetness $M_Y$ | | 252 | 241 | 240 | 243 |
| Color tone $M_C$-$M_Y$ | | 0.98 | 0.29 | 0.99 | 0.45 |
| Haze | % | 17 | 8 | 8 | 7 |
| Gloss 20° | % | 77 | 75 | 76 | 75 |
| Viscosity at SR = 48 $s^{-1}$ | mPas | 2385 | 1722 | 1550 | 1602 |
| Viscosity at SR = 433 $s^{-1}$ | mPas | 833 | 775 | 758 | 765 |

Based on the data of table 3 it can be demonstrated, that the haze of the paint is dramatically reduced with the carbon blacks of the invention. This indicates a better dispersion of the pigment blacks. Furthermore a clear reduction of paint, viscosity and thixotropy, i.e. the drop of viscosity at high shear rates, had been found. These findings were not expected, since separate addition of silica, e.g. fumed silica, generally results in elevated thixotropy and viscosity levels. This may have detrimental effects, e.g. higher binder or solvent demand of the paint and poorer levelling.

EXAMPLE 2

A further series of six furnace blacks were produced with different silicon contents. The carbon black test results are shown in table 4. The starting carbon black (carbon black 5) was produced without the addition of silicon oil to the carbon black feedstock oil. Its ash content of 1.22 wt. %, therefore, results mainly from calcium carbonate added to the feedstock oil to influence the structure of the final carbon black. The surplus ash content of the carbon blacks 6 to 10 is due to their silicon dioxide content.

Paint testing:

The six carbon blacks from table 4 were used to produce black paints in an aqueous binder system (polyurethane dispersion; 30 wt. % polyurethane, relative to the weight of the dispersion) and in a two-component binder system (Synthalan LS768 in 98% butyl acetate). The paints were produced in a similar manner as in Example 1. The results of the paint testing and the rheological behavior of the paints are shown in tables 5 (aqueous binder system) and 6 (two-component binder).

Jetness $M_y$ is improved at a higher silicon content. This effect is pronounced to a greater or lesser degree depending upon the paint binder system used. The silicon content moreover also improves the carbon black stability in the paint, which is manifested by a higher ($M_C$-$M_y$) value, i.e. by a higher blue shade in the calorimetric measurement.

As is shown by tables 5 and 6, viscosity and thixotropy are improved by using carbon blacks containing silicon. Both values fall as the silicon content rises. Especially remarkable is the reduction of the thixotropy-index in the water-based paint as a function of the silicon content (see table 5). With increasing silicon content not only the viscosity is reduced but also the change in viscosity with changing shear rate (thixotropy-index). Due to this property silicon containing carbon blacks can very advantageously be combined with platelike pigments e.g. mica pigments or aluminum flakes. In such paint or printing ink formulations parallel adjustment of the plate-like pigments in the coating is improved. The low thixotropy-index ensures that the viscosity of the paint does not immediately recover high values after the application of the coating which would hinder the mobility of the platelike pigments in the still uncured coating.

Table 6 also contains the flooding behavior observed when a grey paint is prepared having a weight ratio of titanium dioxide to carbon black of 100:4. A pronounced density difference is evident in a grey paint using the starting carbon black 5 (the titanium dioxide floods). As the silicon dioxide content rises, the difference in density between the not rubbed out and the rubbed out paint surface is reduced.

As will be apparent from the foregoing to persons skilled in the art, the term "binder" as used herein includes any suitable conventional binder vehicle for paints and printing inks. Typically they include synthetic organic polymer vehicles in a suitable solvent therefor. Acrylate polymers and resins and polyurethanes are examples thereof. Many other binders can also be used.

Further variations and modifications of the foregoing will be apparent to those skilled in the art and are intended to be encompassed by the claims appended hereto.

German priority application 197 56 465.8 is relied on and incorporated herein by reference.

TABLE 4

Technical properties of Si-doped carbon blacks

| Properties | | Carbon black 5 | Carbon black 6 | Carbon black 7 | Carbon black 8 | Carbon black 9 | Carbon black 10 |
|---|---|---|---|---|---|---|---|
| Ash | wt. % | 1.22 | 2.77 | 6.04 | 8.34 | 9.08 | 10.45 |
| CTAB | $m^2/g$ | 178.3 | 182.9 | 190.9 | 197.9 | 179.2 | 189.7 |
| Iodine adsorption | mg/g | 257.6 | 258.0 | 286.4 | 285.4 | 264.4 | 279.2 |
| DBP | ml/100 g | 60.2 | 60.9 | 62.4 | 63.7 | 62.0 | 63.0 |
| pH value | | 9.7 | 9.9 | 10.0 | 10.0 | 10.1 | 10.0 |

TABLE 5

Paint properties in an aqueous system

| Properties | | Carbon black 5 | Carbon black 6 | Carbon black 7 | Carbon black 8 | Carbon black 9 | Carbon black 10 |
|---|---|---|---|---|---|---|---|
| Rheology: | | | | | | | |
| Viscosity at SR = 48 $s^{-1}$ | mPas | 60.3 | 43.1 | 51.7 | 51.7 | 43.1 | 43.1 |
| Viscosity at SR = 433 $s^{-1}$ | mPas | 41.1 | 37.3 | 41.1 | 45.9 | 38.3 | 38.3 |
| Thixotropy index | | 1.465 | 1.154 | 1.256 | 1.125 | 1.125 | 1.125 |
| Colorimetry: | | | | | | | |
| Jetness $M_Y$ | | 254.5 | 257.5 | 255.7 | 255.1 | 259 | 261.3 |
| Colour tone $M_C$-$M_Y$ | | 0.59 | 1.28 | 0.69 | 0.92 | 1.64 | 2.07 |

TABLE 6

Paint properties in a two-component system

| Properties | | Carbon black 5 | Carbon black 6 | Carbon black 7 | Carbon black 8 | Carbon black 9 | Carbon black 10 |
|---|---|---|---|---|---|---|---|
| Rheology: | | | | | | | |
| Viscosity at SR = 48 $s^{-1}$ | mPas | 1282.9 | 1239.8 | 1119.3 | 1119.3 | 955.7 | 981.5 |
| Viscosity at SR = 433 $s^{-1}$ | mPas | 978.7 | 916.5 | 852.4 | 859.1 | 785.4 | 768.4 |
| Thixotropy index | | 1.311 | 1.353 | 1.313 | 1.303 | 1.217 | 1.248 |
| 5% paint preparation: | | | | | | | |
| Gloss 20° | % | 83.5 | 83.9 | 83.8 | 83.4 | 84.0 | 83.6 |
| Haze | % | 25.1 | 23.9 | 25.8 | 25.4 | 22.3 | 26.8 |
| Jetness $M_Y$ | | 260 | 257.8 | 261.4 | 260.4 | 259.9 | 260.3 |
| Color tone $M_C$-$M_Y$ | | 0.21 | 0.06 | 1.36 | 1.63 | 0.71 | 2.01 |
| Grey paint: $TiO_2$:carbon black = 100:4 | | | | | | | |
| Density, rubbed out | | 0.88 | 0.892 | 0.873 | 0.869 | 0.849 | 0.853 |
| Density, not rubbed out | | 0.677 | 0.666 | 0.701 | 0.729 | 0.719 | 0.700 |
| Flooding, rubbed out = 100% | | 76.9 | 74.7 | 80.3 | 83.9 | 84.7 | 82.1 |

What is claimed is:

1. A paint or printing ink composition comprising a binder system and carbon black as a pigment wherein the carbon black contains 0.1 to 30 wt. % of silicon, calculated as silicon dioxide and relative to the entire weight thereof and containing 0.01 to 2 wt. % by weight of nitrogen, said pigment having been prepared by introducing a silicon containing nitrogen compound with the carbon black feedstock and reacting to form the carbon black.

2. The composition according to claim 1, wherein said binder system contains solvent.

3. The composition according to claim 1, wherein said binder system contains water.

4. The composition according to claim 2 further comprising titanium dioxide pigment or a colored pigment or mixtures of pigments.

5. The composition according to claim 3 further comprising titanium dioxide pigment or a colored pigment or mixtures of pigments.

6. The composition according to claim 2 further comprising at least one platelike pigment.

7. The composition according to claim 3 further comprising at least one platelike pigment.

8. The composition according to claim 6, wherein said platelike pigment is a member selected from the group consisting of a mica. pigment, aluminum flakes and mixtures thereof.

9. The composition according to claim 7, wherein said platelike pigment is a member selected from the group consisting of a mica. pigment, aluminum flakes and mixtures thereof.

10. The composition according to claim 1, further comprising a titanium dioxide pigment or a colored pigment or mixtures of pigments.

11. The composition according to claim 1, further comprising at least one platelike pigment.

12. The composition according to claim 11, wherein said platelike pigment is a member selected from the group consisting of a mica pigment, aluminum flakes and mixtures thereof.

* * * * *